United States Patent [19]

Strait et al.

[11] Patent Number: 4,762,890

[45] Date of Patent: Aug. 9, 1988

[54] METHOD OF GRAFTING MALEIC ANHYDRIDE TO POLYMERS

[75] Inventors: Chad A. Strait, Lake Jackson; Gerald M. Lancaster, Freeport; Ricky L. Tabor, Lake Jackson, all of Tex.

[73] Assignee: The Dow Chemical Company, Midland, Mich.

[21] Appl. No.: 905,099

[22] Filed: Sep. 5, 1986

[51] Int. Cl.$^4$ .......................................... C08F 255/02
[52] U.S. Cl. ...................................... 525/257; 525/53; 525/285
[58] Field of Search ..................... 525/285, 53, 257

[56] References Cited

U.S. PATENT DOCUMENTS

| 3,177,270 | 4/1965 | Jones et al. | 525/263 |
| 3,658,948 | 4/1972 | McConnell | 525/74 |
| 3,868,443 | 2/1975 | Bartz et al. | 156/327 |
| 3,882,194 | 5/1975 | Krebaum et al. | 525/285 |
| 4,010,223 | 3/1977 | Caywood | 525/285 |
| 4,147,740 | 3/1979 | Swiger et al. | 525/285 |
| 4,506,056 | 3/1985 | Gaylord | 525/285 |
| 4,639,495 | 1/1987 | Waggoner | 525/285 |

*Primary Examiner*—Wilbert J. Briggs, Sr.
*Attorney, Agent, or Firm*—Walter J. Lee

[57] ABSTRACT

Maleic anhydride can be satisfactorily grafted to polymers at low pressures by feeding the polymer through a co-rotating, twin-screw extruder and injecting the maleic anhydride and a free radical initiator into the extruder. The maleic anhydride and initiator can be premixed in a solvent solution. The solvent and unreacted maleic anhydride can be removed by low pressure devolatilization.

11 Claims, 1 Drawing Sheet

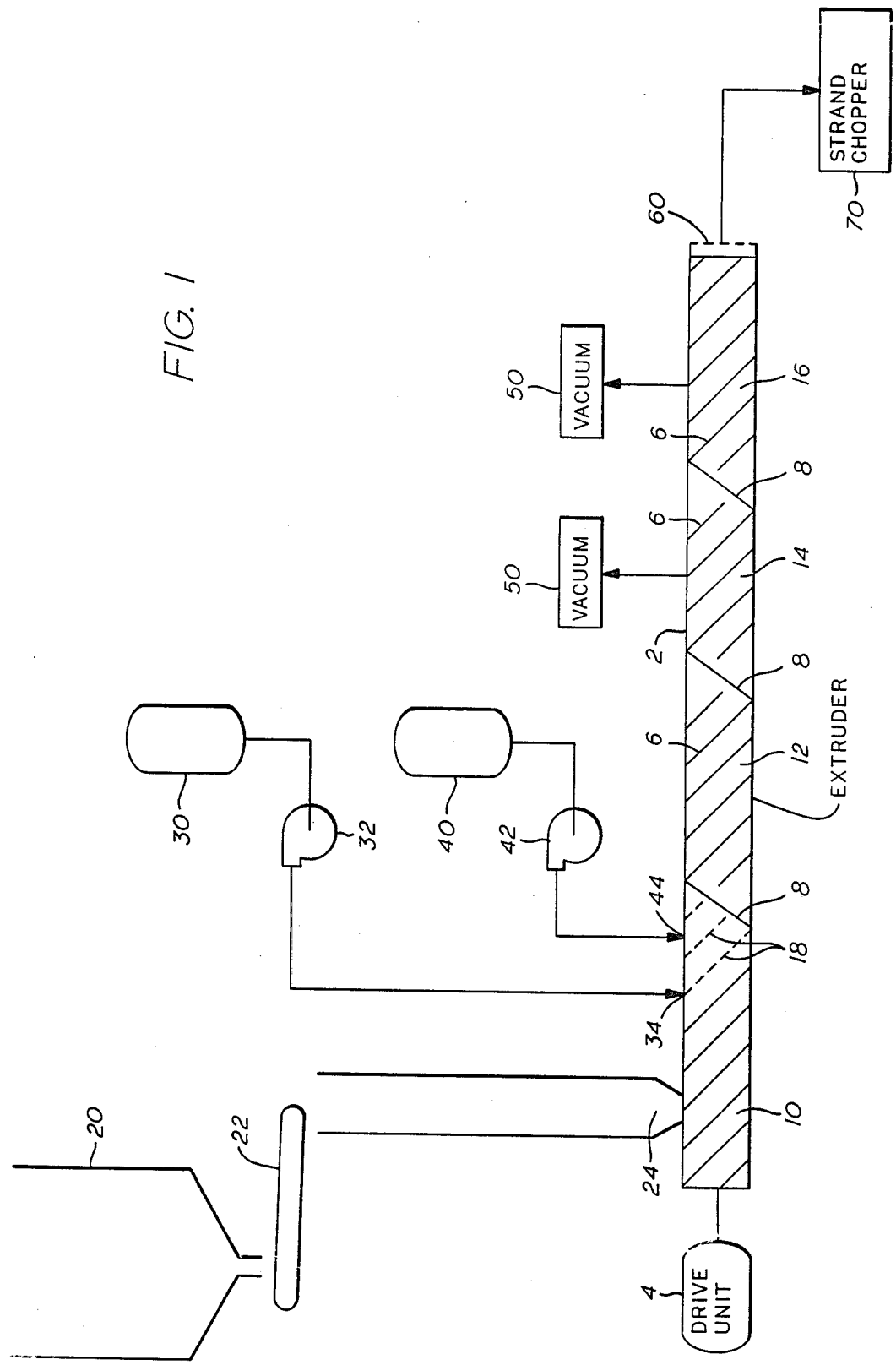

METHOD OF GRAFTING MALEIC ANHYDRIDE TO POLYMERS

FIELD OF THE INVENTION

This invention relates to the grafting of monomers to polymers and, more specifically, relates to the grafting of maleic anhydride using polymer extruding equipment.

DESCRIPTION OF THE PRIOR ART

U.S. Pat. No. 3,868,433, issued to Bartz et al, describes a process for grafting maleic anhydride to polymers using free radical initiation. The initiator and the maleic anhydride are injected at high pressures into a polymer filled, pressurized section of a single screw extruder. The reaction with maleic anhydride occurs at a temperature of from about 160° F. to 450° F., preferably 250° F. to 350° F. The grafting of a combination of maleic anhydride and styrene or acrylic acid is stated to be preferred over the grafting of maleic anhydride alone (column 5, lines 22-24).

U.S. Pat. No. 4,506,056, issued to Gaylord, describes a process for grafting maleic anhydride to ethylenically unsaturated polymers using a single screw extruder. The addition of nitrogen, phosphorous, or sulfur-containing compounds which do not copolymerize with maleic anhydride and inhibit its homopolymerization but not the homopolymerization of methyl methacrylate, is stated to be required to satisfactorily graft maleic anhydride to molten polymers (see, e.g., column 3, lines 9-33).

As experienced by Bartz et al and Gaylord, the grafting of maleic anhydride to polymers using a single screw extruder and free radical initiation has not provided a satisfactory product. Substantial improvements have been made in the product by adding other monomers or compounds prior to grafting.

SUMMARY OF THE INVENTION

The present invention is a method and apparatus for grafting maleic anhydride to polymers, comprising the steps of melting a polymer by heating and shearing the polymer in a co-rotating, twin-screw extruder, injecting maleic anhydride and a free radical initiator into a polymer filled, pressurized section of the extruder, and mixing the polymer and the maleic anhydride in the extruder for sufficient time to graft the maleic anhydride to the polymer. The maleic anhydride and the free radical initiator are preferably mixed in a solvent system prior to injection into the extruder. Devolatilization of the grafted polymer preferably occurs in one or more decompression sections of the extruder. The use of the co-rotating, twin-screw extruder as described results in the satisfactory grafting of maleic anhydride to polymers without the need for additives or high extruder pressures.

BRIEF DESCRIPTION OF THE DRAWINGS

FIG. 1 is a schematic drawing of a preferred apparatus for grafting maleic anhydride to polymers.

DETAILED DESCRIPTION OF A PREFERRED EMBODIMENT

A co-rotating, twin-screw extruder is shown schematically in FIG. 1 by an extruder barrel 2 and a drive unit 4. The drive unit 4 rotates right hand conveying elements 6 and left hand elements 8 within the extruder barrel 2. The right hand elements 6 generally convey material within the extruder barrel 2 from left to right on FIG. 1. The left hand elements 8 momentarily retard the movement of the material causing the material to back-up and fill the extruder barrel 2. The left hand elements 8 divide the extruder barrel 2 into four separate zones 10, 12, 14, 16. A first zone 10 includes right hand conveying elements 6 and mixing type elements 18 for receiving and mixing a polymer, maleic anhydride, and a free radical initiator. A second zone 12 contains right hand conveying elements 6 and further mixes the polymer by shearing action while grafting occurs. A third zone 14 and a fourth zone 16 contain right hand conveying elements 6 and are provided to devolatilize the polymer as described more fully below.

A base polymer, preferably high density polyethylene or linear low density polyethylene, is fed in pellet form from a feed hopper 20 to a feed conveyer 22 and then a feed inlet 24 on the extruder barrel 2. The feed inlet 24 is positioned near the beginning of the first zone 10 within the extruder barrel 2. The base polymers can include, but are not limited to, copolymers of ethylene/$\alpha$-olefins; ethylene/carbon monoxide; and ethylene/acrylic acids (e.g. ethylene/ethylacrylate or ethylene/vinyl acetate). Alpha-olefins generally include monoolefins and does not include ethylene.

The extruder barrel 2 is heated, preferably by clamped-on electric elements, or cooled, preferably by circulating water, to selectively melt or solidify the polymer. The temperature within each of the four zones 10, 12, 14, 16 is independently controlled for use with polymers having different melt characteristics.

Maleic anhydride and a free radical initiator, such as tertiary-butyl peroctoate (2-ethyl hexanoate) or 2,5-dimethyl-2,5-di(t-butylperoxy)hexyne-3, are preferably injected into the extruder barrel 2 at the mixing elements 18 at the end of the first zone 10. The left hand element 8 at the end of the first zone 10 keeps the mixing elements 18 filled with polymer and improves mixing. Suitable free radical initiators include, but are not limited to, alkyl and diakyl peroxides. Initiators having higher stabilities are preferred.

The maleic anhydride is preferably mixed in a non-reactive solvent such as ketones, benzene, alkyl acetates, or chlorinated benzenes and stored in a maleic anhydride feed tank 30. The maleic anhydride can be dissolved in the solvent up to its saturation level. Further, the free radical initiator can be mixed with the maleic anhydride during storage or injected into the extruder barrel 2 separately. The maleic anhydride and solvent solution is pumped from the storage tank 30 by a metering pump 32 and is injected into the first zone 10 through an injection nozzle 34. If the free radical initiator is added separately or if additional initiator is required, the free radical initiator can be stored in a solvent solution in a second storage tank 40 and pumped by a second metering pump 42 for injection into the first zone 10 through a second ejection nozzle 44. The amount of initiator used does not appear to be critical and ratios of maleic anhydride to initiator of from about 1/0.015 to about 1/0.1 by weight have been found to be satisfactory, with ratios from 1/0.025 to 1/0.035 being preferred.

The temperature of the polymer in the first zone 10 and the second zone 12 must be high enough to melt the polymer. Independent temperature control for each zone is desired because the polymers generally experience an increase in viscosity as maleic anhydride is grafted to the polymers. High melt temperatures, e.g. greater than 250° C., may require a more stable initiator than the ones mentioned above. Polymers having melt temperatures of 120° C. to 190° C. prior to feed injection have worked well when Lupersol 130 was used as the initiator.

The pressure in the first zone 10 and the second zone 8 is not critical. However, the first zone 10 should be maintained at a pressure above the vaporization pressure of maleic anhydride, preferably at about 50 to 100 psig. The pressure in the third zone 14 and the fourth zone 16 must be sufficiently low to allow removal of solvent and unreacted maleic anhydride. Vacuum sources 50 are provided to reduce the pressure in the third and fourth zones 14, 16 and a vacuum of 29 inches of mercury has proven sufficient to remove most of the unreacted maleic anhydride.

The temperature of the grafted polymer during devolatilization is preferably kept between about 160° C. and 300° C. to assist in devolatilization. Higher temperatures give lower volatile levels, but may lead to higher gel levels. Lower temperatures lead to higher volatile levels or more work input to remove the volatiles, but may result in lower gel levels. Temperatures of from about 180° C. to 260° C. are preferred to give the best balance of devolatilization and gel level.

The grafted polymer exits the extruder barrel 2 through a die face 60 which produces strands of the grafted polymer. The polymer strands can then be sent to a strand chopper 70 to prepare polymer pellets for use in other processes.

The above described method and apparatus has been used to graft maleic anhydride to polymers to produce grafted polymers having up to about 2 percent by weight of maleic anhydride. The percent of incorporation of maleic anhydride is generally related to the ratio of maleic anhydride to polymer feed until about the level of 2 percent incorporation. At that level, the grafted polymer product is severely crosslinked and acceptable products generally incorporate from about 0.3 percent to about 1.5 percent maleic anhydride by weight.

A conversion of 75 percent of the feed maleic anhydride to grafted maleic anhydride was common for linear low density polyethylenes, and lower percent conversions are expected for high density polyethylenes. A Werner-Pfleiderer ZSK-53/5L co-rotating, twin-screw extruder was used to graft maleic anhydride to polyethylenes at rates from 40 pounds per hour to 160 pounds per hour with no significant change in percent conversion. Production rates of up to the maximum for this equipment (about 300 pounds per hour) are expected to be obtainable. The average residence times within the extruder ranges from about 140 seconds at 40 pounds per hour down to about 45 seconds at 160 pounds per hour polymer rates. A similarly equipped extruder of larger diameter should give an equivalent product at higher rates.

The described equipment is capable of grafting maleic anhydride to high density polyethylene (densities from 0.952 gram/cm$^3$ to 0.965 grams/cm$^3$), or linear low density polyethylenes (densities from 0.945 grams/cm$^3$ to 0.900 grams/cm$^3$) derived from copolymerization with ethylene of one or more α-olefins of three to ten carbons in length, or low density polyethylene. The base polymer is preferably metered into the polymer feed inlet 24 at a low enough rate to starve the extruder at the operating speed prior to the addition of maleic anhydride and the free radical initiator.

The following examples provide details of making and using preferred grafted polymers by the method and apparatus of the present invention.

EXAMPLE 1

A linear low density polyethylene sold under the trademark DOWLEX* 2035 LLDPE, having a melt index of 6 dg/min and a density of 0.919 grams/cc, was fed into a Werner-Pfleiderer ZSK-53/5L co-rotating, twin-screw extruder operating at the following conditions:

| Zone No. | 1 | 2 | 3 | 4 |
| --- | --- | --- | --- | --- |
| Barrel Temp., °C. | 215 | 228 | 233 | 235 |
| Melt Temp., °C. | 135 | 200 | 210 | 240 |
| Screw Speed-200 rpm | | | | |
| Polymer Rate-150 lb/hr | | | | |

* A trademark of The Dow Chemical Company. DOWLEX 2035 LLDPE is a copolymer of octene/ethylene having 10–12 percent octene by weight.

A mixture of maleic anhydride/methyl ethyl ketone/LUPERSOL** 130 at a weight ration of 1/1/0.03 was fed into the extruder through a Warner-Pfleiderer injection nozzle by a positive displacement metering pump at a rate of 2.24 pounds per hour. The injection nozzle was located just upstream of a series of kneading blocks or mixing type elements backed by a left-hand screw section which kept the entire injection area polymer filled and pressurized. A vacuum of 29 inches of mercury was maintained on zones 3 and 4 to devolatilize the grafted polymer. The grafted polymer exhibited a maleic anhydride incorporation of 0.55 percent by weight of the grafted polymer.

** A trademark of Penwalt for 2,5-dimethyl-2,5-di(tertiary butylperoxy)hexyne-3.

EXAMPLE 2

A high density polyethylene resin having a melt index of 10 dg/min and a density of 0.962 g/cc was fed into the extruder of Example 1 under the following conditions:

| Zone No. | 1 | 2 | 3 | 4 |
| --- | --- | --- | --- | --- |
| Barrel Temp., °C. | 170 | 230 | 220 | 220 |
| Screw Speed-230 rpm | | | | |
| Polymer Rate-170 lb/hr. | | | | |

A 45/55/0.032 (methyl ethyl ketone/maleic anhydride/LUPERSOL 130) solution was fed through the injection nozzle at a rate of 5.9 lb/hr. The vacuum level at zones 3 and 4 was 29 inches mercury. The product contained 1.15% grafted maleic anhydride. This product was then blended with DOWLEX* 2035, a linear low density polyethylene (LLDPE) having a melt index of 6 dg/min and a density of 0.919 g/cc, at a ratio of 11.5/88.5 (88.5% LLDPE), melt blended in an extruder, and then co-extruded as the adhesive (middle) layer in a three layer film including high density polyethylene and nylon. The resulting film, when converted into bags, has excellent structural integrity and is suitable for heating contained foods in a microwave oven.

* A trademark of The Dow Chemical Company. DOWLEX 2035 LLDPE is a copolymer of octene/ethylene having 10–12 percent octene by weight.

We claim:

1. A method for grafting maleic anhydride to polymers, comprising the steps of:
   melting an ethylene polymer by heating and shearing the polymer in a co-rotating, twin-screw extruder;
   injecting maleic anhydride and a free radical initiator into a polymer filled, pressurized section of the extruder; and
   mixing the polymer and the maleic anhydride in the extruder for sufficient time to graft the maleic anhydride to the polymer.

2. The method of claim 1, wherein the maleic anhydride and the free radical initiator are mixed in a solvent system prior to injection into the extruder.

3. The method of claim 1, further comprising the step of devolatilizing the polymer in at least one decompression zone of the extruder.

4. The method of claim 2, wherein the maleic anhydride and the free radical initiator are mixed within a ketone prior to injection.

5. The method of claim 4, wherein the polymer is a high density polyethylene resin.

6. The method of claim 5, wherein the ketone is methyl ethyl ketone.

7. The method of claim 5, wherein the ketone is acetone.

8. The method of claim 4, wherein the polymer is a low density copolymer of ethylene/octene.

9. The method of claim 8, wherein the ketone is methyl ethyl ketone.

10. The method of claim 8, wherein the ketone is acetone.

11. The method of claim 1, wherein the extruder predominantly contains right-hand elements, and the polymer filled, pressurized section of the extruder contains a series of mixing type elements that are backed by a left-hand element.

* * * * *